United States Patent
Champenois et al.

[11] Patent Number: 6,132,857
[45] Date of Patent: Oct. 17, 2000

[54] HYBRID COMPONENT WITH HIGH STRENGTH/MASS RATIO AND METHOD OF MANUFACTURING SAID COMPONENT

[75] Inventors: Christophe Jean Roger Champenois, Soisy S/Seine; Laurent Jean Pierre David, St Germain les Corbeil; Gérard Michel Roland Gueldry, Vert Saint Denis; Robert Lucien Martinou, Bry sur Marne, all of France

[73] Assignee: Societe Nationale d'Etude et de Construction de Moterus d'Aviation "Snecma", Paris, France

[21] Appl. No.: 09/215,292

[22] Filed: Dec. 18, 1998

Related U.S. Application Data

[62] Division of application No. 08/804,074, Feb. 21, 1997, Pat. No. 5,887,332.

[30] Foreign Application Priority Data

Feb. 29, 1996 [FR] France .................................. 96.02535

[51] Int. Cl.$^7$ .................................................. B32B 27/04
[52] U.S. Cl. ..................................... 428/300.7; 428/301.1; 428/301.4; 416/224; 416/230; 416/241 A; 416/244 B
[58] Field of Search ............................. 428/292.1, 297.4, 428/298.4, 300.7, 301.1, 301.4; 416/224, 230, 241 A, 244 B

[56] References Cited

U.S. PATENT DOCUMENTS

| | | |
|---|---|---|
| 3,762,835 | 10/1973 | Carlson et al. . |
| 4,006,999 | 2/1977 | Brantley et al. . |
| 4,455,207 | 6/1984 | Sartor et al. . |
| 4,460,531 | 7/1984 | Harris et al. . |

FOREIGN PATENT DOCUMENTS

| | | |
|---|---|---|
| 0 499 052 A2 | 8/1992 | European Pat. Off. . |
| 2219301 | 11/1973 | Germany . |
| 2 082 964 | 3/1982 | United Kingdom . |

*Primary Examiner*—Elizabeth M. Cole
*Attorney, Agent, or Firm*—Oblon, Spivak, McClelland, Maier & Neustadt, P.C.

[57] ABSTRACT

A high-strength hybrid component including a relatively soft first part made of a composite material including an organic matrix reinforced with fibers, a relatively hard second part made of metal, metal alloy, or ceramic, and a transition layer made of a composite material including a matrix of a material that is weldable to the hard part and fibers that are extensions of the fibers of the soft part. The transition layer matrix and the hard part may be formed by deposition of molten material on to the fiber preform of the soft part using flame, electric arc, or plasma. The resin matrix of the soft part is impregnated into the preform and polymerized afterwards. Alternatively, the hard part may be machined to shape and welded to the transition layer before completing the soft part.

18 Claims, 3 Drawing Sheets

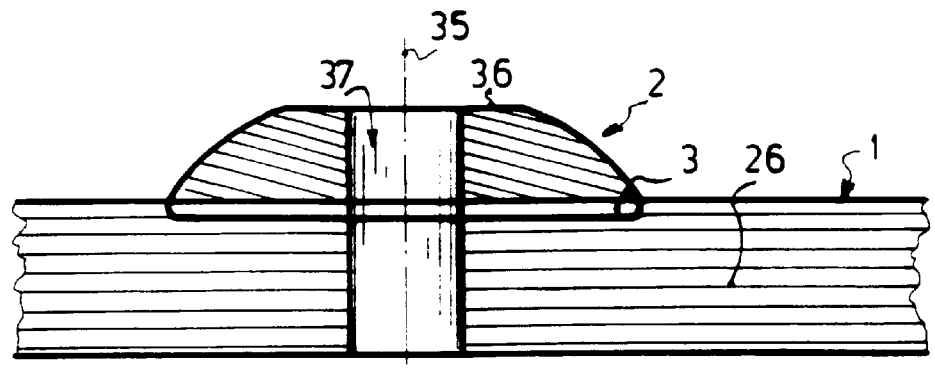
FIG: 8
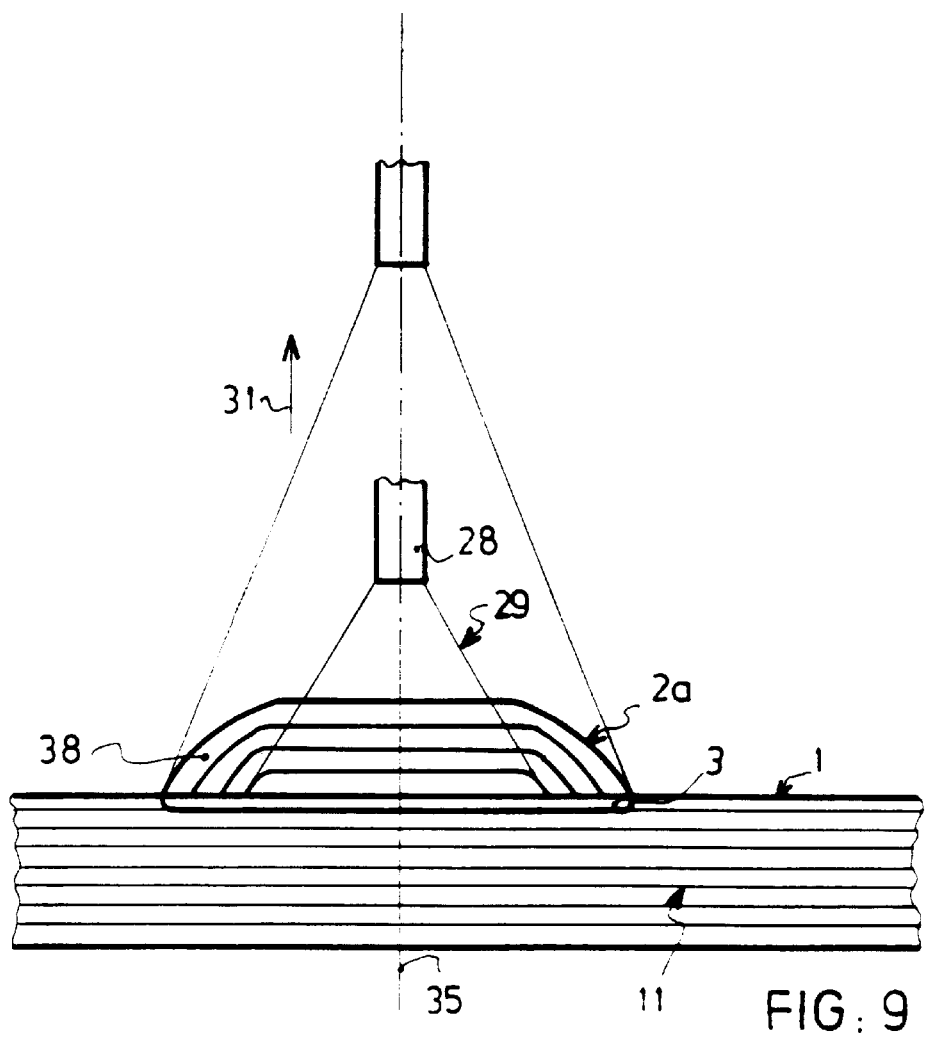
FIG: 9

HYBRID COMPONENT WITH HIGH STRENGTH/MASS RATIO AND METHOD OF MANUFACTURING SAID COMPONENT

This application is a Division of application Ser. No. 08/804,074 Filed on Feb. 21,1997, now U.S. Pat. No. 5,887,332.

BACKGROUND OF THE INVENTION

1. Field of the Invention

The invention relates to hybrid components which comprise at least one first part made of composite material consisting of a fibre-reinforced organic resin matrix, and at least one second part added to it and made of metal, metal alloy or ceramic material. Examples of such components may include, inter alia, a link with an added head, a turbomachine blade with an added leading edge, and a casing with added bosses.

The invention also relates to a method of manufacturing such components.

2. Summary of the Prior Art

Components made of composite material comprising a mass of reinforcement fibres, for example of carbon or silicon carbide (SiC), embedded in a matrix of polymerization-hardened organic resin are often used in industry, particularly in the aeronautics industry, on account of their high strength/mass ratio compared with similar components made entirely of metal. In the components with the best performance, the reinforcing fibres are made into preforms before their impregnation with resin. A preform is an assembly of sheets of fabric which are woven from the fibres intended to form the reinforcement, the sheets of fabric being cut out and assembled together to form at least partly the shape of the component to be made, and thus take up at least part of its volume. The preform may also be made as a monofabric, i.e. a fabric constituted by several sheets of fibres woven together, such a fabric exhibiting a particularly high resistance to decohesion between the sheets of fibres. However, such components made of composite material pose difficulties resulting from the general properties of the organic resin constituting the matrix, namely low hardness and low resistance to temperature, such difficulties not occurring with metal or ceramic components.

A first problem is, therefore, to make components of composite material having a fibre-reinforced organic matrix, in which the parts which are stressed and able to assume a great variety of shapes will be made of metal, metal alloy or ceramic capable of taking the stress and formed to the required shape.

The difficulty lies in the method of bonding between the organic composite part and the metal part, when the area of contact between these two parts is subjected to concentrations of stresses:

- of mechanical origin when the metal part protrudes from the composite part and is subjected to stresses tending to pull it out;
- of mechanical origin, again, as a consequence of different moduli of elasticity or Young's moduli;
- of thermal origin, as a consequence of very different thermal expansion coefficients.

These phenomena are worsened when the metal part is rigid, and thus thick, or when at least one dimension of the area of contact is substantial, which makes it necessary to reinforce the bond by additional mechanical means such as screwing, rivetting, seaming, etc.

A second problem is therefore to effect a very strong bond between the parts of the component made of an organic matrix composite and the parts made of metal, metal alloy or ceramic.

The low resistance of organic resin to abrasion and to impact from foreign bodies poses problems particularly in the case of aircraft propellers. These same problems also arise with the blades of turbine engines for aircraft, especially the fan blades which are situated well to the front of the engines. Indeed, as such blades rotate at speeds of up to 3000 rpm, and may have a height (from root to tip) of up to 1200 mm with a thickness below 30 mm, they are particularly exposed to abrasion by sand entering the engine, or to impact from heavy foreign bodies such as birds.

To overcome these problems, the leading edge of the blade may be covered by a metal coating, but there is then the bonding problem referred to previously. German Patent 4411670 describes a blade in which the bonding of its leading edge to the remainder of the blade is reinforced by screws and seams.

This solution requires additional manufacturing operations, and the strength it achieves remains limited since an excessive number of seams will weaken the blade by the multiplication of the holes made through it. The leading edge is therefore thin and flexible, which does not allow it to withstand properly impacts from heavy objects such as birds.

The low resistance of organic matrix composite materials to localized compressions, for example of punching type, originates from the fact that reinforcement fibres have no effect under this type of stress, whereas they are very effective with respect to tensile stresses. This problem arises in the provision of fixing points for rivets or bolts in components made of composite material, for example, air intake casings, covers or cones for aircraft engines. The problem is only partly solved by using rivets or bolts with wide heads and nuts, as such width remains limited, and substantial concentrations of stresses subsist at the fixing points, requiring a reduced tightening force and an increase of the number of fixing points.

U.S. Pat. No. 4,006,999 discloses a turbomachine blade made of a composite fibre-resin material and including a metal leading edge widely covering the convex and concave flanks of the blade. The composite part of the blade is itself composed of two parts holding grids in the vicinity of the mean plane of the blade. These grids protrude forward and are embedded in the metal constituting the leading edge, so as to strengthen the bond between the leading edge and the remainder of the composite blade. However, the effectiveness of such a solution remains limited, as this bond is effected essentially at the centre of the leading edge, the bonding of the flanks of the leading edge with the remainder of the composite blade being achieved only by adherence. Furthermore, the method of making and assembling the leading edge with the remainder of the blade is not clearly apparent.

The low temperature resistance of organic resins restricts the utilization of components made of composite materials incorporating such resins. A process is known for the thermal protection of metal parts in which plasma projection is used to produce a heat insulating ceramic shield on the surface of the parts. However, the application of this process to parts made of composite material having an organic matrix gives rise to two difficulties:

Firstly, it is not applicable to parts of substantial dimensions because of the great difference between ambient temperature and the temperature at which molten ceramic sets, and of the vitreous type of fracture of the ceramic.

Indeed, on cooling, the ceramic, because it has a greater thermal expansion coefficient, will contract more rapidly with a high risk of cracking, a high compression of the composite material part, and a substantial concentration of stresses tending to bring about detachment of the ceramic layer.

Secondly, the heat released by the plasma projection of molten ceramic onto the part made of composite material will cause considerable degradation of the resin, reducing the strength of the part. The released heat will also bring about the destruction by pyrolysis of the resin in the vicinity of the surface of the part, which reduces the strength of the bond between the ceramic layer and the composite part of the component.

A process is known for the protection of components made of a composite material consisting of reinforcement fibres and organic resin, involving plasma projection of a layer of molten metal or metal alloy onto the component. This process suffers from the drawbacks described above, and although the danger of cracking may be reduced by using a malleable material, the process is restricted to the formation of thin protective coatings on components which are not greatly stressed.

SUMMARY OF THE INVENTION

It is an object of the invention to provide a hybrid high strength component comprising a first part, termed the soft part, made of a composite material consisting of a fibre-reinforced organic resin matrix, and at least one second part, termed the hard part, made of a material selected from the group consisting of metals, metal alloys and ceramics, said second part being able to have large dimensions and to have at least one place where its dimension in any direction is at least 8 mm, and said component having a very strong bond between the first part and the second part.

To this end the invention proposes to provide the component with a transition layer between said soft part and said hard part and completely separating said soft part from said hard part, the said transition layer being made of a composite material comprising a matrix which is weldable to the material of said hard part and reinforcement fibres embedded in said matrix, said reinforcement fibres being formed by extensions of said fibres of said soft part whereby said fibres/reinforcement fibres intersect the boundary between the said soft part and said transition layer at least at the periphery of said boundary.

In this way a particularly strong bond is obtained thanks to a double continuity, namely continuity of the matrix of the transition layer with the material of the hard part, and continuity of the reinforcement fibres of the transition layer with those of the soft part.

It will be appreciated that this double continuity, at least at the periphery of the transition layer, achieves a high shear strength of the hard part on the soft part, this shear strength being even more appreciable when the hard part forms a projection from the soft part.

The bonding is even better when the double continuity extends throughout the surface of the transition layer.

The thickness of the transition layer and the depth of penetration of the fibres of the soft part into the transition layer are not critical. It will be sufficient for the fibres to be fully embedded in the matrix of the transition layer and the matrix of the soft part of the component, such that said fibres are held by the said matrices. This makes it possible to eliminate the cause of decohesion of the soft part with the hard part by rupture of the matrices, and by decohesion between fibre and matrix in the vicinity of the boundary separating the transition layer from the soft part.

Preferably, the matrix of the soft part and the matrix of the transition layer will make mutual contact in order to ensure the fibres are embedded in the vicinity of the boundary between the soft part and the transition layer, thereby ensuring that the bond is not weakened in this highly stressed area.

Preferably the fibres pass through the boundary between the soft part and the transition layer at an angle of between 15 and 75° to the said boundary, so as to increase the capacity of the fibres to resist the detachment of the soft part from the transition layer.

In a preferred embodiment, the reinforcement fibres each form an elbow in the transition layer and extend on both sides of the elbow into the soft part. This helps to improve the gripping of the fibres by the matrix of the transition layer, to reduce the thickness of the said transition layer, and to increase the strength of the bond between the soft part and the transition layer.

Preferably the reinforcement fibres will belong to sheets of fabric occupying the volume of the soft part at least in the vicinity of the transition layer, the sheets of fabric extending into and occupying the volume of the transition layer. The effect of this is to achieve the passage of a high number of fibres through the boundary between the transition layer and the soft part, these fibres being well distributed over the area of the boundary and intersecting in this region as weft threads and warp threads, thereby reinforcing the bond between the soft part and the hard part of the component. Such a structure also very simply enables the fibres to be disposed all over the boundary separating the transition layer from the soft part, thus increasing the strength of the bond between the hard part and the soft part.

The sheets of fabric may belong to a mono-fabric, so as to increase the number of fibres passing through the boundary between the transition layer and the soft part and thereby strengthen still further the bond between the soft part and the hard part of the component.

The invention should not be confused with the component disclosed in the above-mentioned U.S. Pat. No. 4,006,999. In the present invention, the transition layer completely separates the hard part from the soft part, the reinforcement fibres passing, at least at the periphery, through the boundary between the transition layer and the soft part and being enclosed by the matrices of the transition layer and the soft part, thereby forming a strong bond between the hard part and the soft part. In U.S. Pat. No. 4,006,999, the transition layer corresponding to that of the present invention is localized at the centre of the hard part, and the fibres that extend away from it are simply tangential to the hard part and to the soft part. This arrangement therefore does not enable a bond to be obtained between the hard part and the soft part which is comparable to the bond obtained with the present invention.

The invention also provides a method of manufacturing such components implementing the well known RTM (resin transfer moulding) process, the method including the following steps:

a) making a fibre preform to the shape of the soft part of the component together with the transition layer;

b) forming the transition layer by plasma projection of a molten material onto a portion of the preform, said material being weldable with the material of the hard part;

c) forming the hard part of the component, particularly in rough form, on the transition layer;

d) inserting the assembly constituted by the preform, the transition layer and the hard part into a mould; and e) injecting resin into the mould so as to impregnate the preform to form the soft part, polymerizing said resin, and removing the resulting assembly from the mould.

Depending on the shape to be obtained, the formation of the hard part may be effected by:

f) building up the material of the hard part using flame, electric arc or plasma projection; or g) machining the second part, and welding it to the transition layer.

After polymerization of the resin, and removal of the assembly from the mould, the hard part will generally be the subject of a complementary machining and finishing operation.

Preferably the mould will have a cavity which surrounds the hard part with enough clearance for there to be no contact between the walls of the mould and the hard part.

Before the Injection of resin, the space left free between the hard part and the walls of the mould will be filled with an elastomer. This has two advantages:

elimination of the risk of deformation of the component as a result of a wall of the mould pushing against the hard part, which is still not precisely shaped at this stage of the process; and, saving on resin, as the elastomer prevents the very liquid resin from moulding around the hard part.

In a particular embodiment of the invention, the hybrid component is a turbomachine blade, such as a fan blade for an aero-engine, the blade comprising an aerodynamic portion made of a composite material having an organic matrix, and a metal alloy leading edge added to it.

Preferably, the blade will be formed with a fibre preform constituted by a stack of sheets of fabric arranged parallel to the mean plane of the aerodynamic portion of the blade, the upstream edge of each sheet reaching as far as and extending into the transition layer. The front edges of the sheets will preferably form a bulge or bulb extending into the leading edge, so as to increase the area of the transition layer, and, in consequence, the solidity of the bond between the soft first part of the component and the transition layer.

Also, the fibre preform will preferably be in the form of a monofabric, the warp threads joining the sheets together forming elbows in the transition layer, and improving the gripping of the fibres by the matrix of the transition layer.

In the case of a fan blade for an aircraft engine, the fibre is usually made of high-strength carbon, silicon carbide (SiC), or some other material with equivalent properties, and the leading edge will be made of a titanium alloy TA6V. With a thickness of from 8 to 10 mm, measured in a direction proceeding downstream of the blade, the leading edge will have a much improved rigidity compared to the leading edge of the above-mentioned German Patent 4411679. This rigidity can be improved without trouble by raising this thickness to at least 20 mm, which will make the blade particularly resistant to impact from heavy foreign bodies, in spite of its great lightness relative to blades made entirely of metal.

In another embodiment of the invention, the soft first part is a wall, for example of a casing, a cover or an air intake cone, and the hard second part is a boss or a plurality of bosses formed on the said wall.

In yet another embodiment of the invention, the hard second part is a ceramic heat shield applied, for example, on the inner wall of a turbomachine casing.

The present invention should not be classed as being a new use of the surface treatment process involving plasma projection of molten metal or metal alloy on a part made of composite material having an organic matrix, or any alternative of this process, nor as articles thus obtained. In contrast:

a) the metal or ceramic part is not a simple coating but a prominent part of variable shape, and is welded to the matrix of the transition layer which is interpenetrated by the fibres of the first part;

b) this metal or ceramic part is obtained by building it up with material, or by welding a formed part, prior to the resin impregnation of the fibre preform.

As a result hybrid components are obtained in which the metal or ceramic portion may protrude substantially from the composite portion having an organic matrix, and which possess:

a very strong bond of the welded type between the two portions; and, perfect soundness of the material of the portion made of organic composite material.

The invention is particularly useful in the case of large-sized components as, during the cooling of the hard second part, the fibres of the first part, which are not immobilized by the resin matrix, follow the contractions of the second part without internal stress. The subsequent polymerization of the resin will then produce only low internal stresses, as it is carried out at a temperature ranging from 100° C. to 300° C., i.e. very much below the fusion temperature of the ceramic or metallic second part, which is from 1300° C. to 1700° C. For the same reasons, the invention enables components to be made with large-size ceramic parts without the risk of cracking caused by the vitreous rupture of the ceramic during cooling.

The present invention is not restricted to components having a single second part, and the term "second part" is intended to denote one or more separate parts. It may be the case, for example, that a blade may be reinforced by a metal or metal alloy addition not only at the leading edge as described earlier, but also on the flanks of the root by which the blade is held, and at the trailing edge. This may also be the case for a casing or a cover having a plurality of bosses.

The invention will now be further described with reference to the preferred embodiments, given by way of example only, and the accompanying drawings.

BRIEF DESCRIPTION OF THE DRAWINGS

FIG. 8 illustrates a wall of organic composite material having a boss formed on it according to the invention.

FIG. 9 illustrates the fashioning of the boss on the wall.

DESCRIPTION OF THE PREFERRED EMBODIMENTS

Figure 1:
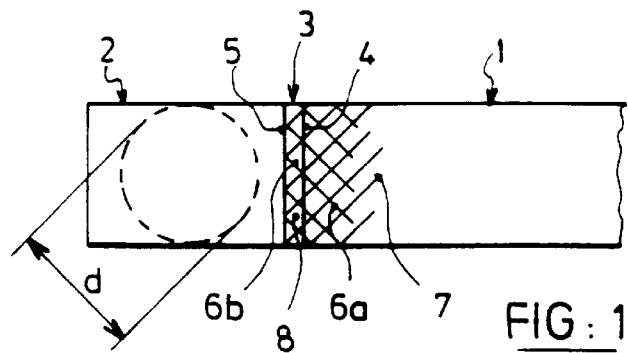
FIG. 1 shows a bar made of a composite material having an organic matrix and to which a metal end has been joined in accordance with the invention.

The component shown in FIG. 1 is a bar comprising a body part 1 and an end part 2 separated by a transition layer 3, 4 and 5 denote the boundary surfaces between the transition layer 3 and the parts 1 and 2 respectively.

The part 2 has at least one place where a dimension d in any direction is at least 8 mm, and may project from the part 1. In other words an imaginary sphere of diameter d may be inscribed in the part 2.

The part 1 is composed of high-strength fibres 6a capable of withstanding high temperatures, such as fibres of carbon, silicon carbide (SiC) or boron carbide, the fibres 6a being embedded in a matrix 7 of organic resin hardened by polymerization.

The transition layer 3 is composed of fibres 6b which are extensions of fibres 6a, the fibres 6b themselves being embedded in a matrix 8 of a material which is weldable with that of the part 2. The material of the part 2 may be metal, a metal alloy or ceramic.

Denoted by 6 are the fibres which have a segment 6a in the part 1 and a segment 6b in the part 2. In order that the fibres 6 are held tightly in the vicinity of the boundary surface 4, the matrix 7 of the part 1 reaches as far as contact with the matrix 8 of the transition layer 3. This prevents the fibres 6 from being in overhanging position, and improves the bonding between the part 1 and the transition layer 3. The bond between the transition layer 3 and the part 1 may be improved as regards shear stress by arranging that the fibres 6 pass through the boundary surface 4 at an angle of incidence of between 15° and 75° relative to the surface 4.

Figure 2:
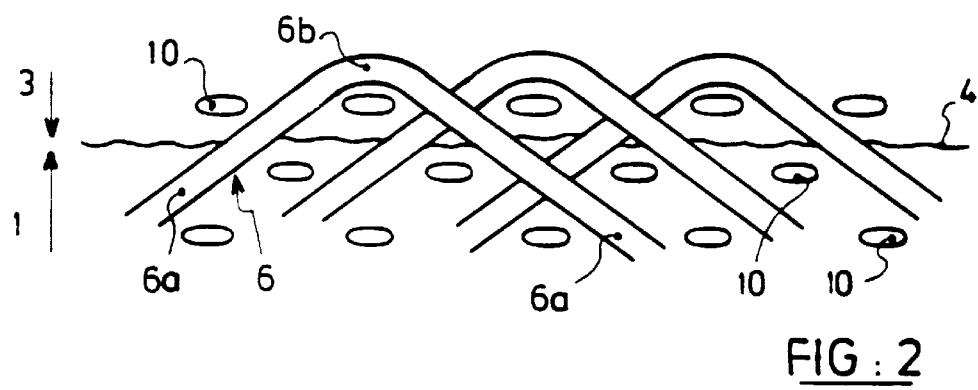
FIG. 2 illustrates the structure of a monofabric in the transition layer and in the vicinity of the latter in a component of the invention.

With reference now to FIG. 2, the fibres 6 are shown included in a monofabric, that Is to say in a fabric made up of several layers of weft threads 10 connected together by the threads 6. These threads 6, as they pass around the weft threads 10 at the surface of the fabric, form elbows 6b within the transition layer 3, while the portions 6a of the threads leading from the elbows 6b extend into the monofabric within the part 1. With such an arrangement, the threads 6 perform an effective hooking between the transition layer 3 and the part 1, and hence reinforce the bond between the said transition layer 3 and the part 1.

Figure 3:
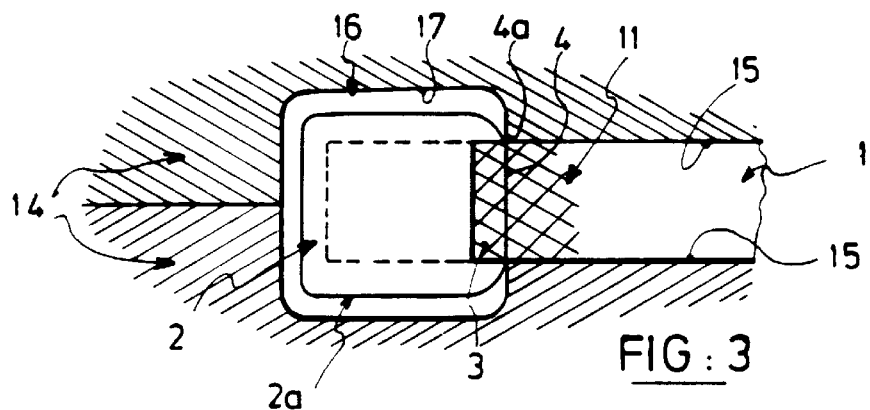
FIG. 3 illustrates the moulding of the bar shown in FIG. 1.

A first embodiment of the method of making a component in accordance with the invention is illustrated in FIG. 3, and comprises the following stages.

a) Making a fibre preform 11 to the shape of the part 1 increased by the transition layer 3. Such preforms are known to the specialist and may consist of sheets of fabric assembled as a monofabric and/or simply woven threads or strips wound on a core.

b) Making the transition layer 3 by plasma projection of molten material which is the same as that used for the part 2 or is weldable with the material of the part 2, which could be a metal, a metal alloy or ceramic. Masks, not shown, may be placed against the preform right up to the line of the boundary 4 which is to be formed so as not to project molten material on the remainder of the preform 11.

c) Making a rough form 2a of the part 2 with sufficient over-thickness on the transition layer, by depositing the material of part 2 dropwise in molten form by flame or electric arc deposition.

d) Placing the unit thus obtained, i.e. consisting of the preform 11, the transition layer 3 and the roughly formed part 2a, in a mould 14 including walls 15 defining the shape of the part 1 and a cavity 16 surrounding the rough part 2a with adequate clearance, taking into account the unevennesses of the rough part 2a.

e) Injecting an elastomer between the walls 17 of the cavity 16 and the rough part 2a to fill up the empty space therebetween.

f) Injecting liquid resin by the RTM (resin transfer moulding) process into the preform 11 bounded by the walls 15, to produce the part 1.

g) Demoulding the unit and machining the rough part 2a to make the finished part 2.

Figure 4:
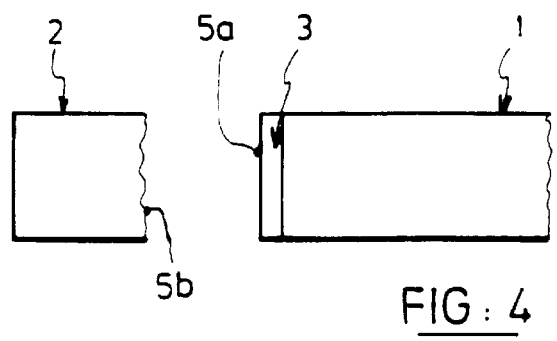
FIG. 4 illustrates the bar when the metal end part is machined separately and welded to the transition layer.

FIG. 4 illustrates a variant of the embodiment just described. In this variant the unit consisting of the preform 11 and the transition layer 3 is produced in conformity with the above steps (a) and (b)

The surface 5a of the transition layer 3 is machined, and a pre-machining of the part 2, is effected, including providing the part with a surface 5b with a shape complementary to that of the surface 5a.

The part 2 is then welded to the transition layer 3 by brazing together the surfaces 5a and 5b. The component is then finished in accordance with the above described steps (d), (e), (f) and (g).

Figure 5:
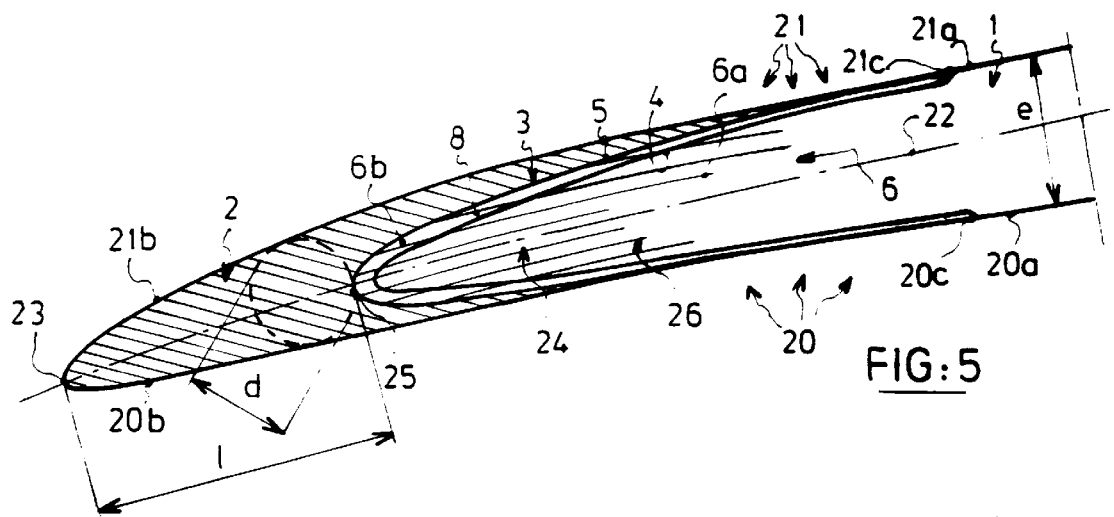
FIG. 5 illustrates the forward part of a blade constructed in accordance with the invention.

FIG. 5 shows an embodiment of the invention in the form of a turbomachine fan blade including a first part 1 which constitutes the blade proper, a second part 2 which constitutes the leading edge, and a transition layer 3 between the parts 1 and 2.

The blade proper (i.e. the aerodynamic portion) is made of a composite material including a matrix 7 of organic resin reinforced with high-strength carbon fibres 6. The blade has a concave flank 20 or intrados face, and a convex flank 21 or extrados face. 20a and 20b respectively denote the portions of the intrados face 20 on the part 1 and the leading edge part 2, and 20c denotes the line of demarcation between the portions 20a and 20b. 21a and 21b respectively denote the portions of the extrados face 21 on the part 1 and the leading edge part 2, and 21c denotes the line of demarcation between the parts 21a and 21b. Also, 22 denotes the imaginary mean plane half way between the intrados face 20 and the extrados face 21, which two faces meet in the mean plane 22 to define the foremost line 23 of the leading edge 2. The lines 20c and 21c define the rearmost lines of the leading edge 2.

The part 1 has a projection 24 which penetrates widely into leading edge 2. This arrangement increases the area 4 of the transition layer and thus improves the bonding of the parts 1 and 2, particularly against shear in response to stress applied perpendicularly to the mean plane 22. The forward end of the projection 24 is denoted at 25.

In its bulkiest part, that is to say just in front of the projection 24, the leading edge 2 has a dimension d in any direction of at least 8 mm. In other words, a sphere of diameter d=8 mm can be inscribed within the leading edge 2.

Preferably, this leading edge 2 will have a dimension l along the mean plane 22, i.e. between the lines 23 and 25, at least equal to the thickness e of the blade in order to improve the rigidity of the said leading edge 2.

Preferably, the reinforcement fibres 6 will belong to sheets of fabric arranged parallel to the mean plane 22. This arrangement is economic to achieve, and allows a maximum number of fibres 6b to extend into the transition layer 3 for a strong bonding of the transition layer 3 to the part 1.

This is an advantage of the invention over the prior art. Due to the fact that the edges of the sheets 26 of fabric flush with the surface of the blade are very vulnerable to impacts from foreign bodies, it is usual to arrange these sheets 26 parallel to the intrados and extrados faces 20 and 21 so as to bring the edges of the sheets to the inside or to the rear of the blade. In the present invention, on the other hand, the leading edge 2, which is very rigid against front to back stresses and widely surrounds the front of the part 1, efficiently protects the edges of the sheets 26.

The use of a monofabric in this second embodiment has the advantages already described with reference to the first embodiment.

Figure 6:
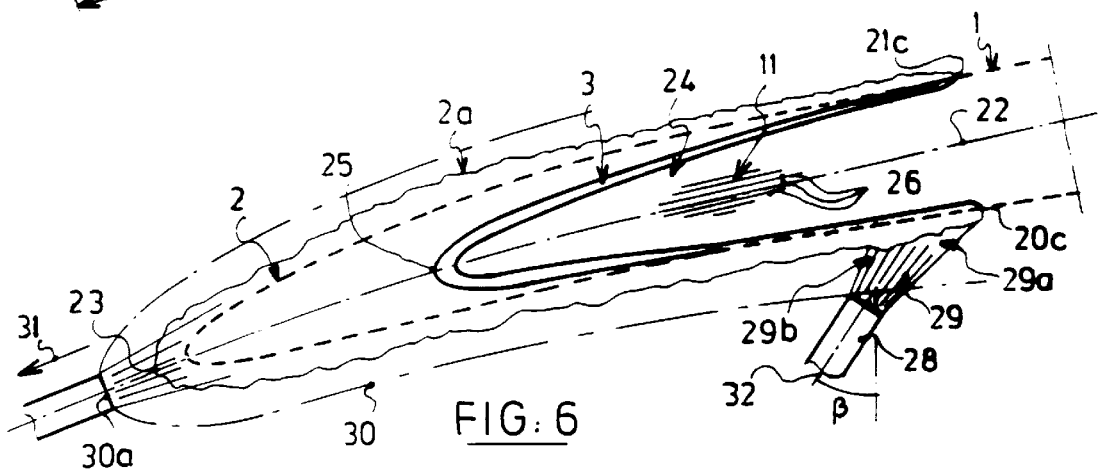
FIG. 6 illustrates the fashioning of the leading edge of the blade by plasma projection.

Referring now to FIG. 6, the blade is produced as follows. A fibre preform 11 is made to the shape of the part 1 of the blade, including the projection 24 and the transition layer 3, using sheets of fabric 26 parallel to the mean plane 22. These fabric sheets can be cut out separately to the required shape, stacked, and then sewn together. Preferably they will form an integral part of a monofabric. The transition layer 3 is then produced by plasma projection of material on to the portion 24 as far as the lines 20c and 21c. A rough formation 2a of the leading edge 2 is then built up by adding material. In a preferred embodiment, this material is deposited with a plasma torch 28 projecting a conical beam 29 of droplets of the molten material on to the transition layer 3. The torch 28 is shifted in the plane of FIG. 6 along a trajectory 30 initially enveloping the projection 24, and moving away progressively from the projection 24 in the direction 31 towards the front of the leading edge 2, as the rough formation 2a grows. Reference 30a indicates the front of the trajectory 30, i.e. the intersection of the said trajectory 30 with the mean plane 22 at the front of the blade.

This trajectory 30 is combined with a trajectory along the leading edge 2, i.e. in a direction perpendicular to the plane of FIG. 6.

In the preferred embodiment, the operation will start with the torch 28 depositing a strip of material on the projection 24 along the line 20c or 21c following a trajectory perpendicular to the plane of FIG. 6. The torch 28 will be displaced along the trajectory 30 towards the point 30a to deposit another strip of material adjacent to the first with a partial overlap, and so on until the other end 21c or 20c of the rough formation 2a is reached. Similarly, successive layers of material will be deposited by progressively staggering the trajectory 30 in the direction 31, the path of the torch 28 becoming increasingly shorter on both sides of the point 30a, and the torch finally becoming immobilized at the point 30a to deposit the last strips of material along the line 23.

In order that the material deposited has a variable thickness: thin in the vicinity of the lines 20c and 21c, and thick towards the line 25, the plasma torch 28 will be slanted by an angle B so as to direct the flow of material 29 towards the rear of the blade. This ensures that less material is deposited in the part 29a of the flow 29 toward the rear of the blade, and more material is deposited in the part 29b of the flow toward the front of the blade. Thus, in a single pass, the strip of material deposited is thick along one edge and thins down towards the other edge. The shaping of the rough formation 2a is carried out using a standard digitally-controlled six-axis machine. Perfecting the process in each different case according to the shape to be obtained is within the normal experimental capabilities of the specialist.

Figure 7:
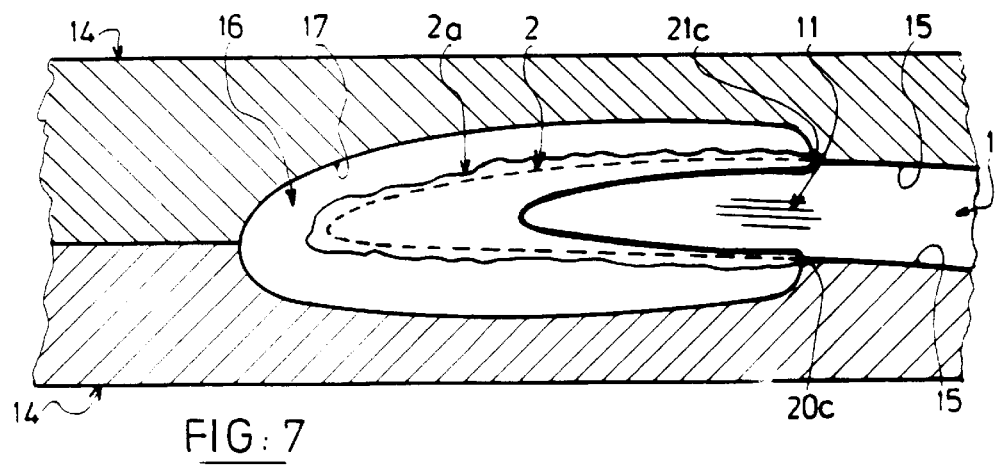
FIG. 7 illustrates the moulding of the blade.

With reference now to FIG. 7, the sequence of operations followed in making the component is similar to that of the preceding embodiment. The unit consisting of the preform 11 and the rough formation 2a is placed in a mould 14 having walls 15 which define the shape of the finished part 1, and a cavity 16 which surrounds the rough formation 2a with adequate clearance, the boundary between this cavity 16 and the walls 15 facing the lines 20c and 21c. The space left between the rough formation 2a and the walls 17 of the cavity 16 is filled by injection of an elastomer. The part 1 is then shaped by injection and polymerization of resin by the RTM process. The blade is then removed from the mould, and the final leading edge 2 is machined from the rough formation 2a.

The plasma torch 28 is the preferred means of producing rapidly the aerodynamic profile of the leading edge 2 of the blade, particularly when the dimensions of the blade are great. Deposition of material by flame or electric arc, as well as the welding of a separately machined part, may also be effected, especially when the dimensions of the blade are small.

In the embodiment shown in FIG. 8, the part 2 is a boss on the wall 1 of a casing or a cover, the reinforcement fibres of which are provided by sheets of fabric parallel to the wall. The boss 2 projects from the wall 1 and is fastened to this wall 1 by the transition layer 3 having an area substantially identical to that of the base of the boss 2. This boss 2 has an overall circular shape about an axis 35, a machined surface 36, which is plane and parallel to the wall 1, and a machined hole 37 on the axis 35 passing through the boss 2 and the wall 1.

As shown in FIG. 9, after the preform 11 of the wall 1 has been produced, a plasma torch 28 is set up on the axis 35 of the boss to be made, and the operator fashions in succession the transition layer 3 and the rough formation 2a of the boss 2 by the projection of a conical flow of droplets of molten material on to the preform 11. Several projections are effected, in each case the torch 28 being moved away from the wall of the preform 11 in the direction 31 parallel to the geometric axis 35 so as to superimpose ever wider layers 38 of the material and thus produce the roughly shaped boss 2a.

In the case of bosses of extensive shape, the movement 31 of the torch is combined with an orbital movement parallel to the wall 1.

The component is then fashioned as in the preceding examples.

Generally, in the case of large components, it will be advantageous to make the preform 11 with fibres 6 coated with a very thin layer of resin and to insert the preform into the mould 14 for polymerization to its final shape as a preliminary step. This sufficiently stiffens the preform 11 to facilitate the forming of the transition layer 3 and the rough formation 2a while retaining the advantages of the dry preform previously described.

What is claimed is:

1. A hybrid component comprising:
    a first part, termed the soft part, composed of fibres embedded in an organic resin matrix;
    at least one second part, termed the hard part, made of a material selected from the group consisting of metals, metallic alloys and ceramics, said hard part having at least one place where its dimension in any direction is at least 8 mm; and
    a transition layer between said soft part and said hard part and completely separating said soft part from said hard part, said transition layer being made of a composite material including a matrix which is weldable to the material of said hard part and reinforcement fibres embedded in said matrix, said transition layer being maintained against said soft part by the reinforcement fibres, and said reinforcement fibres being formed by extensions of said fibres of said soft part into at least a periphery of a boundary between said soft part and said transition layer.

2. A hybrid component according to claim 1, wherein said reinforcement fibres belong to sheets of fabric occupying the volume of said transition layer and also the volume of said soft part at least in the vicinity of said transition layer.

3. A hybrid component according to claim 1, wherein said reinforcement fibres belong to a monofabric occupying the volume of said transition layer and also the volume of said soft part at least in the vicinity of said transition layer.

4. A hybrid component according to claim 1, wherein said fibres/reinforcement fibres pass through said boundary between said soft part and said transition layer at an angle of between 10° and 75° in order to strengthen the bond between said transition layer and said soft part.

5. A hybrid component according to claim 1, wherein at least some of said reinforcement fibres form elbows in said transition layer so as to strengthen the bonding between said transition layer and said soft part.

6. A hybrid component according to claim 1, wherein said component is a turbomachine blade, said first part forming an aerodynamic portion of said turbomachine blade and said second part forming a leading edge of said turbomachine blade.

7. A hybrid component according to claim 6, wherein said fibres/reinforcement fibres are provided by a preform constituted by sheets of fabric arranged parallel to a mean plane of said blade so that an edge of said sheets extends into said transition layer.

8. A hybrid component according to claim 6, wherein said leading edge has a thickness of at least 20 mm in the forward direction of said blade.

9. A hybrid component according to claim 1, wherein said hard part constitutes a boss.

10. A hybrid component according to claim 1, wherein said hard part constitutes a ceramic heat shield.

11. A hybrid component according to claim 1, wherein the matrix of the soft part and the matrix of the transition layer are in mutual contact.

12. A hybrid component according to claim 11, wherein said reinforcement fibres belong to sheets of fabric occupying the volume of said transition layer and also the volume of said soft part at least in the vicinity of said transition layer.

13. A hybrid component according to claim 11, wherein said reinforcement fibres belong to a monofabric occupying the volume of said transition layer and also the volume of said soft part at least in the vicinity of said transition layer.

14. A hybrid component according to claim 11, wherein said fibres/reinforcement fibres pass through said boundary between said soft part and said transition layer at an angle of between 10° and 75° in order to strengthen the bond between said transition layer and said soft part.

15. A hybrid component according to claim 11, wherein at least some of said reinforcement fibres form elbows in said transition layer so as to strengthen the bonding between said transition layer and said soft part.

16. A hybrid component according to claim 11, wherein said component is a turbomachine blade, said first part forming an aerodynamic portion of said turbomachine blade and said second part forming a leading edge of said turbomachine blade.

17. A hybrid component according to claim 11, wherein said hard part constitutes a boss.

18. A hybrid component according to claim 11, wherein said hard part constitutes a ceramic heat shield.

* * * * *

UNITED STATES PATENT AND TRADEMARK OFFICE
CERTIFICATE OF CORRECTION

PATENT NO. : 6,132,857
DATED : October 17, 2000
INVENTOR(S): Christophe Jean Roger Champenois et al.

It is certified that an error appears in the above-identified patent and that said Letters Patent is hereby corrected as shown below:

Col. 5, line 19, change "Injection" to --injection--.

Col. 7, line 30, change "Is" to --is--;

line 52, after "preform" insert --11--.

Col. 8, line 12, after "(b)" insert a period.

Signed and Sealed this

Twenty-ninth Day of May, 2001

Attest:

NICHOLAS P. GODICI

Attesting Officer      Acting Director of the United States Patent and Trademark Office